United States Patent Office 3,520,916
Patented July 21, 1970

3,520,916
PROCESS FOR THE PREPARATION OF N-FLUORO CARBAMATES
Vytautas Grakauskas, Arcadia, Calif., assignor to Aerojet-General Corporation, Azusa, Calif., a corporation of Ohio
No Drawing. Filed Oct. 14, 1964, Ser. No. 404,209
Int. Cl. C07c 125/06
U.S. Cl. 260—468          11 Claims This invention pertains to a novel method for the preparation of N-substituted-N-fluorocarbamates by the addition of N-fluorocarbamates to the >C=C< bond.

It is an object of this invention to prepare N-substituted-N-fluorocarbamates by a novel method. More particularly, it is an object of this invention to prepare N-substituted-N-fluorocarbamates by reacting an ethylenically unsaturated compound with an N-fluorocarbamate. In another aspect, it is an object of this invention to prepare these compounds in a convenient manner and in good yield. These and other objects of this invention will be apparent from the detailed description which follows.

The preparation of N-substituted-N-fluorocarbamates by the process of this invention involves the acid catalyzed addition of an N-fluorocarbamate to an ethylenically unsaturated compound, and proceeds in accordance with the following general reaction equation:

(I)
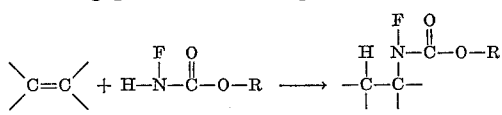

wherein R is any hydrocarbyl group such as alkyl, aryl, aralkyl, alkaryl, etc. Preferably, R is a lower hydrocarbyl group having from 1 to about 8 carbon atoms.

In Reaction (I), the remaining valences may be satisfied by any non-reactive group such as hydrogen, halogen, cyano, nitro, alkoxy, alkyl, haloalkyl, nitroalkyl, hydroxyalkyl and carboalkoxy. In general, when these substituent groups are organic, the lower members of the series having from 1 to 8 carbon atoms are preferred.

Typical of the ethylenically unsaturated compounds which may be employed in the process of this invention are olefins such as ethylene, propylene, 1-butene, 2-butene, 1-pentene, 2-pentene, 1-hexene, 3-heptene, 1-octene and 1-decene; and the vinyl halides such as vinyl chloride, vinyl bromide and vinyl fluoride; the vinylidene halides such as vinylidene chloride and vinylidene fluoride; the cyano-substituted ethylenes such as acrylonitrile and tetracyano ethylene; the nitroolefins such as nitroethylene and 4-nitro-1-butene; the vinyl ethers such as vinyl methyl ether and vinyl ethyl ether; and the alkyl acrylates and methacrylates such as methyl acrylate, ethyl acrylate and methyl methacrylate. Other suitable reactants include allyl alcohol, allyl chloride and allyl bromide.

It should also be understood that two of the unsatisfied valences in both the ethylenically unsaturated reactant and the product may be joined by an alkylene group to form a cyclic ring. This can be better understood by reference to the following equation:

(II)
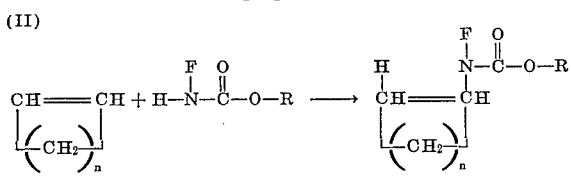

wherein n is an integer of from 1 to about 4.

Thus, cyclobutene, cyclopentene and cylohexene may be employed as reactants in the process of this invention.

An especially preferred class of ethylenically unsaturated reactants for use in this invention are those having the formula:

wherein X is hydrogen, halogen, lower alkyl, cyano, nitro, lower alkoxy or lower carboalkoxy.

Illustrative N-fluorocarbamate reactants are:

methyl N-fluorocarbamate,
ethyl N-fluorocarbamate,
propyl N-fluorocarbamate,
butyl N-fluorocarbamate,
octyl N-fluorocarbamate,
cyclohexyl N-fluorocarbamate,
phenyl N-fluorocarbamate,
tolyl N-fluorocarbamate,
benzyl N-fluorocarbamates, and
biphenylyl N-fluorocarbamate.

These n-fluorocarbamate reactants may be prepared by reacting fluorine with a suitable compound of the formula:

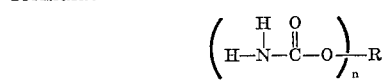

wherein in the preceding formula R is an organic radical having a valency equal to $n$ and $n$ is an integer of from 1 to about 10. The reaction is desirably carried on in inert moderator such as water or one of the lower alkanols having from 1 to about 10 carbon atoms. The reaction is carried on at a temperature between about $-40°$ C. and about $+40°$ C., preferably from about $-5°$ C. to $+5°$ C.

The process of this reaction is carried out in the presence of an acid catalyst. Ordinary mineral acids such as concentrated sulfuric, hydrochloric and phosphoric; and Friedel-Crafts catalysts such as aluminum trichloride, ferric chloride, stannic chloride and boron trifluoride are suitable for this purpose. The amount of acid employed is usually an effective catalytic amount of from about 0.01 percent to about 10 percent by weight based on the total weight of reactants. The reaction temperature is not critical. However, it has been found that the best yield of the desired product and the lowest degree of contamination result when the reaction is carried out att a temperature of from about $-20°$ C. to about $+50°$ C., and more preferably at a temperature of from about $-5°$ C. to about $+30°$ C.

The two reactants are usually employed in about stoichiometric amounts since this results in the most effective utilization of reactants. However, this aspect is not critical and the concentration of the reactants may be varied over a wide range.

The compounds produced by the process of this reaction have many uses. For example, these compounds have been found to possess physiological activity, and therefore may be used in drug formulations and as insecticides. These compounds are also useful intermediates in the preparation of difluoramine. The uses of difluoroamine are described in greater detail in assignee's copending U.S. patent application Ser. No. 75,070, filed Dec. 6, 1960.

The compounds of this invention are isolated from the acid catalysts and by-products by conventional techniques known to those skilled in the art. The compounds may be purified in the normal way of distillation, extraction and/or recrystallization.

The examples which follow are presented solely for the purpose of illustration and should not be regarded as

3 limiting the invention in any way. In the examples the parts and percentages are by weight unless otherwise indicated.

EXAMPLE I

Preparation of ethyl N-fluoro-N-(2-octyl)carbamate

To a solution of 5.4 grams of ethyl N-fluorocarbamate (0.05 mole) in 25 ml. of concentrated sulfuric acid was added 5.6 grams of octene-1 (0.05 mole) at 5 to 10° C. with stirring over a period of 15 minutes. The reaction was exothermic, and the reaction mixture was cooled externally by means of an ice-water bath. At the end of the addition, the reaction mixture was kept at 5 to 10° C. for an additional 10 minutes, and was then allowed to warm to 25 to 27° C. After standing for 10 minutes at that temperature, the mixture was cooled to 5 to 10° C. and was poured on 80 grams of crushed ice. The water-insoluble oil was extracted with three 25-ml. portions of methylene chloride. The combined methylene chloride extracts were dried over Drierite and were filtered, and the filtrate was concentrated. The residual, somewhat dark liquid was purified by distillation to give 8.1 grams of a colorless liquid, B.P. 58 to 59° C./0.1 mm., $n_D^{25}$ 1.4262.

*Analysis.*—Calc'd for $C_6H_{13}CH(CH_3)NFCOOC_2H_5$, $C_{11}H_{22}FNO_2$ (percent): C, 60.20; H, 10.11; F, 81.66; N, 6.39. Found (percent): C, 60.60; H, 10.5; F, 9.3; N, 6.52.

EXAMPLE II

Preparation of ethyl N-fluoro-N-(2-hexyl)carbamate

To a solution of ethyl N-fluorocarbamate (0.05 mole) in 25 ml. of concentrated sulfuric acid is added hexene-1 (0.05 mole) at 5 to 10° C. with stirring over a period of 15 minutes. The reaction is exothermic, and the reaction mixture is cooled externally by means of an ice-water bath. At the end of the addition, the reaction mixture is kept at 5 to 10° C. for an additional 10 minutes, and is then allowed to warm to about 25° C. After standing, the mixture is cooled to 5 to 10° C. and is poured on crushed ice. The water-insoluble oil is extracted with three 25-ml. portions of methylene chloride. The combined methylene chloride extracts are dried and filtered, and the filtrate is concentrated. The residue is purified by distillation to give a good yield of ethyl N-fluoro-N-(2-hexyl)carbamate.

When the above example is repeated using ethylene in lieu of hexene-1, ethyl N-fluoro-N-ethyl carbamate is obtained.

EXAMPLE III

Preparation of ethyl N-fluoro-N-(2-carbomethoxyethyl) carbamate

The reaction of methyl acrylate (4.3 grams, 0.05 mole) and a concentrated sulfuric acid (20 ml.) solution of ethyl N-fluorocarbamate (5.4 grams, 0.05 mole) was carried out under essentially the same reaction conditions described for octene-1 addition. At the end of the run the sulfuric acid solution of the product was poured onto 100 grams of crushed ice and the resulting aqueous mixture was extracted with four 30-ml. portions of methylene chloride. The combined methylene chloride extracts were dried with Drierite and were filtered, and the filtrate was concentrated to remove the solvent. The residual liquid was fractionated; after the removal of some unreacted acrylate and 1.3 grams of unreacted ethyl N-fluorocarbamate, 5.1 grams of a colorless liquid, B.P. 52 to 54° C./0.1 to 0.3 mm., $n_D^{25}$ 1.4235 was obtained (50 percent yield, 70 percent conversion).

*Analysis.*—Calc'd for $C_7H_{12}FNO_2$ (percent): C, 43.52; H, 6.26; F, 9.84; N, 7.25. Found (percent): C, 43.3; H, 6.17; F, 10.2; N, 7.15.

4

EXAMPLE IV

Preparation of butyl N - fluoro-N-(2-carboethoxyethyl) carbamate

The reaction of ethyl acrylate (4.3 grams, 0.05 mole) and a concentrated sulfuric acid (20 ml.) solution of butyl N-fluorocarbamate (5.4 grams, 0.05 mole) is carried out at about 10° C. for about 30 minutes. At the end of the run the sulfuric acid solution of the product is poured onto crushed ice and the resulting aqueous mixture is extracted several times with methylene chloride. The combined methylene chloride extracts are dried and filtered. The filtrate is concentrated to remove the solvent. The residual liquid is fractionated; after the removal of some unreacted acrylate and butyl N-fluorocarbamate to give about 6 grams of butyl N-fluoro-N-(2-carboethoxyethyl)carbamate, identified by gas chromatography.

EXAMPLE V

Preparation of ethyl N-fluoro-N-(2-ethoxyethyl) carbamate

To a mixture of 5.4 grams of ethyl N-fluorocarbamate (0.05 mole) and 3.6 grams ethyl vinyl ether (0.05 mole) at 20° C. was added one drop of concentrated hydrochloric acid. The reaction temperature began to increase immediately, and Dry Ice acetone cooling was applied to keep the reaction temperature at 35 to 45° C. After 5 to 10 minutes, the exothermic reaction ceased and the reaction mixture was fractionated. After removal of a small forerun, 7.5 grams of a colorless liquid distilled at 35 to 36° C./0.1 to 0.3 mm., $n_D^{25}$ 1.4194.

*Analysis.*—Calc'd for $C_7H_{14}FNO_3$ (percent): C, 46.92; H, 7.88; N, 7.81; F, 10.60. Found (percent): C, 46.4; H, 7.8; N, 7.9; F, 10.8.

EXAMPLE VI

Preparation of butyl N-fluoro-N-(2-ethoxyethyl) carbamate

To a mixture of 5.4 grams of butyl N-fluorocarbamate (0.05 mole) and 3.6 grams ethyl vinyl ether (0.05 mole) at 20° C. is added one drop of concentrated hydrochloric acid. The reaction temperature begins to increase immediately, and Dry Ice acetone cooling is applied to keep the reaction temperature at 35 to 45° C. After 5 to 10 minutes, the exothermic reaction ceases and the reaction mixture is fractionated. There is obtained a good yield of butyl N-fluoro-N-(2-ethoxyethyl)carbamate.

EXAMPLE VII

Preparation of ethyl N-cyclohexyl-N-fluorocarbamate

To a solution of 4.3 grams (0.04 mole) of ethyl N-fluorocarbamate in 22 ml. concentrated sulfuric acid at 0 to 5° C. was added with cooling and vigorous stirring 3.3 grams (0.04 mole) of cyclohexene over a period of 5 to 7 minutes. At the end of the addition the cooling bath was removed and the yellow solution was allowed to warm up by itself. The reaction temperature increased gradually to 28° C. After standing at this temperature for 10 to 15 minutes, the reaction mixture cooled to 24° C. for 30 minutes, then cooled to 0 to 5° C., and poured on 80 grams of crushed ice. The dark oily liquid was extracted with four 20-ml. portions of methylene chloride, and combined extracts dried with Drierite, filtered and the filtrate concentrated to remove the solvent. The dark residual liquid was purified by distillation to give 6.2 grams of a colorless liquid, B.P. 50 to 51° C./0.1 mm., $n_D^{25}$ 1.4430. Yield was 82 percent.

*Analysis.*—Calc'd for $C_9H_{16}NFO_2$ (percent): C, 57.12; H, 8.52; N, 7.40; F, 10.1. Found (percent): C, 56.7; H, 8.65; N, 7.65; F, 10.5.

EXAMPLE VIII

Preparation of ethyl N-cyclopentyl-N-fluorocarbamate

The reaction between ethyl N-fluorocarbamate, 6.43 grams (0.06 mole), and cyclopentene, 4.1 grams (0.06 mole), in 30 ml. of concentrated sulfuric acid was carried out in a manner identical to that described above for cyclohexene. The reaction product was purified by distillation to give 3.5 grams of a colorless liquid, B.P. 39° C./0.2 mm., $n_D^{25}$ 1.4375 (34 percent yield), which was identified as ethyl N-cyclopentyl-N-fluorocarbamate.

*Analysis.*—Calc'd for $C_9H_{14}NFO_2$ (percent): C, 54.84; H, 8.05; N, 8.00; F, 10.84. Found (percent): C, 54.40; H, 7.99; N, 8.21; F, 12.3.

Having fully described the invention, it is intended that it be limited only by the lawful scope of the appended claims.

I claim:

1. The process which comprises reacting an N-fluorocarbamate of the formula:

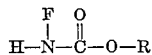

with an ethylenically unsaturated compound of the formula:

in the presence of an effective amount of an acid catalyst, and recovering the N-substituted-N-fluorocarbamate produced; wherein in the above formulae, R is hydrocarbyl and X is selected from the group consisting of hydrogen, halogen, lower alkyl, cyano, nitro, lower alkoxy and lower carboalkoxy.

2. The process which comprises reacting an N-fluorocarbamate of the formula:

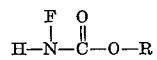

with an ethylenically unsaturated compound of the formula:

in the presence of an effective catalytic amount of sulfuric acid; and recovering the N-substituted-N-fluorocarbamate produced; wherein in the above formulae, R is hydrocarbyl and X is selected from the group consisting of hydrogen, halogen, lower alkyl, cyano, nitro, lower alkoxy and lower carboalkoxy.

3. The process which comprises reacting an N-fluorocarbamate of the formula:

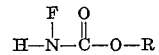

with an ethylenically unsaturated compound of the formula:

in the presence of an effective catalytic amount of hydrochloric acid, and recovering the N-substituted-N-fluorocarbamate produced; wherein in the above formulae, R is hydrocarbyl and X is selected from the group consisting of hydrogen, halogen, lower alkyl, cyano, nitro, lower alkoxy and lower carboalkoxy.

4. The process which comprises reacting an N-fluorocarbamate of the formula:

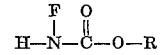

with an ethylenically unsaturated compound of the formula:

in the presence of an effective amount of an acid catalyst, and recovering the N-substituted-N-fluorocarbamate produced; wherein in the above formulae, R is hydrocarbyl and n is an integer of from 1 to 4.

5. The process which comprises reacting an N-fluorocarbamate of the formula:

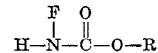

with an ethylenically unsaturated compound of the formula:

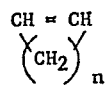

in the presence of an effective catalytic amount of sulfuric acid, and recovering the N-substituted-N-fluorocarbamate produced; wherein in the above formulae, R is hydrocarbyl and n is an integer of from 1 to 4.

6. The process which comprises reacting an N-fluorocarbamate of the formula:

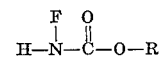

with an ethylenically unsaturated compound of the formula:

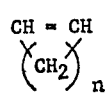

in the presence of an effective catalytic amount of hydrochloric acid, and recovering the N-substituted-N-fluorocarbamate produced; wherein in the above formulae, R is hydrocarbyl and n is an integer of from 1 to 4.

7. The method of preparing ethyl N-fluoro-N-(2-octyl)carbamate which comprises reacting ethyl N-fluorocarbamate wtih octene-1 in the presence of an effective catalytic amount of concentrated sulfuric acid.

8. The method of preparing ethyl N-fluoro-N-(2-carbomethoxyethyl)carbamate which comprises reacting ethyl N-fluorocarbamate with methyl acrylate in the presence of an effective catalytic amount of concentrated sulfuric acid.

9. The method of preparing ethyl N-fluoro-N-(2-ethoxyethyl)carbamate which comprises reacting ethyl N-fluorocarbamate with ethyl vinyl ether in the presence of an effective catalytic amount of concentrated hydrochloric acid.

10. The method of preparing ethyl N-cyclohexyl-N-fluorocarbamate which comprises reacting ethyl N-fluorocarbamate with cyclohexene in the presence of an effective catalytic amount of concentrated sulfuric acid.

11. The method of preparing ethyl N-cyclopentyl-N-fluorocarbamate which comprises reacting ethyl N-fluorocarbamate with cyclopentene in the presence of an effective catalytic amount of concentrated sulfuric acid.

References Cited

Hoffman et al., Chem. Reviews, vol. 62, pages 1 to 18, 1962.

LORRAINE A. WEINBERGER, Primary Examiner

P. J. KILLOS, Assistant Examiner

U.S. Cl. X.R.

260—465.4, 479, 482, 999